United States Patent
Boucher (10) Patent No.: US 7,552,317 B2
(45) Date of Patent: Jun. 23, 2009

(54) METHODS AND SYSTEMS FOR GROUPING INSTRUCTIONS USING MEMORY BARRIER INSTRUCTIONS

(75) Inventor: Michael L. Boucher, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 598 days.

(21) Appl. No.: 10/882,596

(22) Filed: Jun. 30, 2004

(65) Prior Publication Data

US 2005/0251657 A1    Nov. 10, 2005

Related U.S. Application Data

(60) Provisional application No. 60/568,494, filed on May 4, 2004.

(51) Int. Cl.
   G06F 7/38      (2006.01)
   G06F 9/00      (2006.01)
   G06F 15/00     (2006.01)

(52) U.S. Cl. ............................ 712/228; 711/163

(58) Field of Classification Search ............. 711/163; 712/228
   See application file for complete search history.

(56) References Cited

U.S. PATENT DOCUMENTS 6,651,151 B2 *    11/2003    Palanca et al. .............. 711/163

OTHER PUBLICATIONS

SPARC International, Inc., "The SPARC Architecture Manual", Version 9, PTR Prentice Hall, No. SAV09R1459912, pp. i-xi, 182-188, 2000.

* cited by examiner

Primary Examiner—Niketa I Patel
Assistant Examiner—Jesse R Moll
(74) Attorney, Agent, or Firm—Sonnenschein Nath & Rosenthal LLP (57) ABSTRACT

Methods, systems, and articles of manufacture consistent with the present invention provide a memory instruction manager for managing the execution of instructions associated with a program. The memory instruction manager assigns a first group identifier to a first instruction associated with a program and to a second instruction associated with the program, and provides, after the first instruction, a memory barrier instruction having the first group identifier such that one or more processors with access to the program are inhibited from executing the second memory instruction until the first memory instruction is executed.

34 Claims, 7 Drawing Sheets

```
300
    302
    SUM = 0
    !$omp parallel do private(I) shared(AB) reduction(+:SUM)
316  308 DO I = 1, N
         AB(I) = AB(I) * 526     304
         SUM = SUM + AB(I)                    314
         316 END DO
         !$omp end do nowait    306
318      CD = CD + SUM
         312
```

Figure 4

| | |
|---|---|
| 400 | |
| 404   402 | |
| fzero %f6 | ! Initialize register f6 (SUM) to zero |
| TOP: lddf [%g1], %f0 | ! Load value from memory address in |
| | ! register g1, which holds AB(I), into |
| 406 | ! register f0. |
| fmuld %f0,%f2,%f4 | ! Multiply by 526, which is contained |
| 408 | ! in register f2. |
| 410 stdf %f4,[%g1] | ! Store the scaled AB value back to memory |
| add %g1,8,%g1 | ! Point to the next value in AB |
| 412 faddd %f6,%f4,%f6 | ! Accumulate the result of the multiply |
| | ! into SUM |
| subcc %g2,1,%g2 | ! Decrement the loop counter |
| 414 bne TOP | ! If the loop has more interactions left |
| 416 | ! then go to TOP |
| stdr %f6,[%g3] | ! Store the partial sum into a pre-defined |
| 418 | ! buffer whose address is stored in |
| | ! register g3. |

Figure 5

```
     500
      ↓
   404    402       502
      \   ~      ┌─ 
       fzero %f6, GRP=0       504
TOP:  lddf [%g1], %f0, GRP=0
       406                    506
         fmuld %f0,%f2,%f4, GRP=0
       408                         508
          stdf %f4,[%g1], GRP=0
       410
           add %g1,8,%g1, GRP=0     510
       412  faddd %f6,%f4,%f6, GRP=0
                                    512
            subcc %g2,1,%g2, GRP=0
       414  bne TOP, GRP=0     514
                         516
       416 stdr %f6,[%g3], GRP=0
       418                   518
```

! Initialize register f6 (SUM) to zero
! Load value from memory address in
! register g1, which holds AB(I), into
! register f0.
! Multiply by 526, which is contained
! in register f2.
! Store the scaled AB value back to
! memory
! Point to the next value in AB
! Accumulate the result of the
! multiply into SUM
! Decrement the loop counter
! If the loop has more interactions left
! then go to TOP
! Store the partial sum into a
! pre-defined buffer whose address is
! stored in register g3.

Figure 6

```
     600
      ↓
   404    402       502
      \   ~      ┌─
       fzero %f6, GRP=0       504
TOP:  lddf [%g1], %f0, GRP=0
       406                    506
         fmuld %f0,%f2,%f4, GRP=0
       408                         508
          stdf %f4,[%g1], GRP=0
       410
           add %g1,8,%g1, GRP=0     510
       412  faddd %f6,%f4,%f6, GRP=0
                                    512
            subcc %g2,1,%g2, GRP=0
       414  bne TOP, GRP=0     514
                         516
       416 stdr %f6,[%g3], GRP=3
       418                   518
             membar #Sync,GRP=3
       602                 604
```

! Initialize register f6 (SUM) to zero
! Load value from memory address in
! register g1, which holds AB(I), into
! register f0.
! Multiply by 526, which is contained
! in register f2.
! Store the scaled AB value back to
! memory
! Point to the next value in AB
! Accumulate the result of the
! multiply into SUM
! Decrement the loop counter
! If the loop has more interactions left
! then go to TOP
! Store the partial sum into a
! pre-defined buffer whose address is
! stored in register g3.
! Stall future operations until all
! group 3 operations are complete;
! processor may use this to infer that
! group 3 operations are high-priority

```
       806
         ╲─add    %g0,0,%i0              ! Store group # in i0, initialize to 0
   ┌ T1:                    ╲₇804
   │      ─add    %i0,1,%i0              ! Try next group
   │  808 ─queryrd %i0,%i1               ! Number of outstanding reads for
   │      810                            ! group # in register i0 into i1
802┤      ─querywr %i0,%i2               ! Number of outstanding writes for
   │      812                            ! group # in register i0 to i2
   │      ─add    %i1,%i2,%i2            ! i2 = total outstanding memory
   │      814                 ╲─816      ! operations in this group
   │      ─bne    T1                     ! Non-zero outstanding operations,
   └      818                            ! try next group
          nop
          stdf   %f6,[%g3],GRP=%i0       ! Store the partial sum into a
                                         ! pre-defined buffer whose address
          418         804                ! is stored in register g3.
          ─membar #Sync,GRP=%i0          ! Stall future operations until all
          602                            ! operations on this group are
                                         ! complete; processor may use this
                                         ! to infer that operations for this
                                         ! group are high-priority
```

METHODS AND SYSTEMS FOR GROUPING INSTRUCTIONS USING MEMORY BARRIER INSTRUCTIONS

CROSS REFERENCE TO RELATED APPLICATIONS

This application claims the benefit of the filing date of U.S. Provisional Application No. 60/568,494, entitled "METHODS AND SYSTEMS FOR GROUPING AND MANAGING INSTRUCTIONS," filed on May 4, 2004, which is incorporated herein by reference to the extent permitted be law.

FIELD OF THE INVENTION

The present invention relates to methods and systems for improving the run-time performance of a program. In particular, methods and systems consistent with the present invention relate to grouping and managing memory instructions associated with a program for execution by one or more processors.

BACKGROUND

One way to increase the speed of a computer program is to divide its operations into separate tasks and execute those tasks concurrently on multiple processors. The multiple processors may or may not share a common memory. One of the slowest operations in a computer system is an operation involving memory-resident data. Fetching operands (associated with one or more processor instructions) from memory may be hundreds or thousands of times slower than fetching those same operands from a register in the processor. Storing data in memory can be comparably slow. Although various common techniques are effective in hiding that latency from an application, the latency still affects the processor design and, thus, the performance of the application.

It is common practice in processor design to attach a high-speed cache that stores the most recently referenced data and data near that recently referenced data. A cache hides the latency of a fetch or read memory access by quickly supplying a copy of memory resident data that is stored in the cache. A cache also hides the latency of a write memory access by various means.

A cache interacts with the memory in units of cache lines. A cache line is typically on the order of 32-512 bytes and is typically the smallest unit of exchange between the cache and the memory. When a processor requests a value from memory that is not resident in the cache, the memory transfers a cache-line-sized chunk of data containing the data requested by the processor. The entire line of data is stored in the cache. The cache then extracts the requested data from the line transferred from memory and returns it to the processor. When a processor writes data to an address that is represented in its cache, the cache copy is updated and the cache line is marked as "dirty." When the line is flushed from cache back to memory, the line in memory is updated. When a processor writes data to an address that is not represented in its cache, the line is read from memory as described above for a read and then the new data is written into the cache as described above for writes.

The effectiveness of caches in hiding memory latency is attenuated by several factors. First, cache sizes are strongly constrained and the size of a single cache as a percentage of total physical memory continues to shrink. As an example, Sun Microsystem, Inc.'s™ E15K machine or computer can have up to $2^{39}$ bytes of read access memory (RAM), but the UltraSparc-III™ processor typically used in the E15K machine has only $2^{23}$ cache, a ratio of $1:2^{16}$. Advances in the E15K machine may include incorporating $2^{52}$ bytes of RAM and a per-processor cache size nowhere close to the $2^{36}$ bytes that would be required to maintain a $1:2^{16}$ ratio. For this and other reasons, caches are becoming less effective for programs with a large working set and non-sequential access patterns because the likelihood of a desired value being in cache is dropping with the decline of the percentage of coverage. (Percentage of coverage refers to the percentage of memory that can be covered with a particular cache. For example, on a computer system with 512 megabytes of memory, an 8 megabytes cache covers $8/512*100 \approx 1.6\%$.)

Secondly, in conventional systems distance to memory is increasing in cycle terms, which typically causes memory access speed to increase, resulting in a performance problem. As the distance to memory goes from hundreds of cycles to thousands of cycles, the difficulty of hiding the latency sharply increases. The increased latency also causes problems in processor design because the processor needs to keep track of an operation until it is complete. Informally speaking, a write is typically considered complete when memory is updated. If memory is 1000 cycles away from the processor and a write can be issued in every cycle then the processor must keep track of at least 2000 outstanding memory transactions in order to avoid stalling on a write-buffer-full (2000 transactions=1 transaction/cycle=1000 cycles to send the data to memory and 1000 cycles for the acknowledgement to return.). Keeping track of 2000 independent transactions is typically quite difficult.

In conventional systems, memory access speed is also increased and parallel performance decreased by the way that conventional processors execute programs that use certain data structures. Conventional processors typically interact sequentially with a sequence of homogeneous memory operations. For example, a processor may give preference to reads over writes, but does not usually distinguish between the relative importances of individual reads. A processor executing a thread in a program running in parallel on multiple processors often does a series of memory operations related to computation and then a final memory operation to synchronize its activities with the other processors operating in parallel. It may then issue memory operations to get more work for itself so that it may proceed on an independent part of the computation and it will block all processing until its requests for more work are satisfied. In many computations, it is much more important to get more work than to report that previous work has completed, but the sequential nature of the way that processors interact with streams of memory operations stalls that important request behind less important requests. As the distance to memory increases and techniques such as caching become less capable of hiding the latencies involved, the problem of having important operations stalled behind ever-slower operations of lower importance becomes more pressing.

Therefore, a need has long existed for a method and system that overcome the problems noted above and others previously experienced.

SUMMARY

Methods, systems, and articles of manufacture consistent with the present invention improve the parallel performance of a program by associating a plurality of instructions in the program with a respective one of a plurality of group identifiers and managing the execution of a plurality of instructions associated with a program in accordance with the group identifiers.

In accordance with methods consistent with the present invention, a method in a data processing system for managing the execution of a plurality of instructions associated with a program is provided. The method includes assigning a first group identifier to one or more of the plurality of instructions appearing in the program after a first of the plurality of instructions; assigning a second group identifier to the first instruction, wherein the second group identifier is different than the first group identifier; and providing a memory barrier instruction associated with the first instruction and having the second group identifier such that one or more processors with access to the program execute the plurality of instructions of the program in an order in accordance with the second group identifier associated with the memory barrier instruction.

In accordance with methods consistent with the present invention, a method in a data processing system for managing the execution of a plurality of memory instructions associated with a program is provided. The method includes determining whether execution of a second of the memory instructions before a first of the plurality of memory instructions increases parallel performance of the program. When it is determined that execution of the second memory instruction before the first memory instruction increases parallel performance of the program, the method further includes assigning one of a plurality of group identifiers to the second memory instruction that is not assigned to the first memory instruction. The method may also include providing a memory barrier instruction associated with the second memory instruction and having the one group identifier such that one or more processors with access to the program are prompted to execute the second memory instruction before the first memory instruction.

In accordance with articles of manufacture consistent with the present invention, a computer-readable medium containing instructions for managing the execution of a plurality of instructions associated with a program. The method includes assigning a first group identifier to one or more of the plurality of instructions appearing in the program after a first of the plurality of instructions; assigning a second group identifier to the first instruction, wherein the second group identifier is different than the first group identifier; and providing a memory barrier instruction associated with the first instruction and having the second group identifier such that one or more processors with access to the program execute the plurality of instructions of the program in an order in accordance with the second group identifier associated with the memory barrier instruction.

In accordance with articles of manufacture consistent with the present invention, a computer-readable medium containing instructions for managing the execution of a plurality of memory instructions associated with a program. The method includes determining whether execution of a second of the memory instructions before a first of the plurality of memory instructions increases parallel performance of the program; when it is determined that execution of the second memory instruction before the first memory instruction increases parallel performance of the program, assigning one of a plurality of group identifiers to the second memory instruction that is not assigned to the first memory instruction; and providing a memory barrier instruction associated with the second memory instruction and having the one group identifier such that one or more processors with access to the program are prompted to execute the second memory instruction before the first memory instruction.

In accordance with systems consistent with the present invention, a data processing system is provided. The data processing system comprises a memory device and one or more processors. The memory device includes a first program having a plurality of instructions. The memory device further includes an instruction manager program that assigns a first group identifier to one or more of the plurality of instructions appearing in the first program after a first of the plurality of instructions, assigns a second group identifiers to the first instruction, wherein the second group identifier is different than the first group identifier, and provides a memory barrier instruction associated with the first instruction and having the second group identifier. The one or more processors are configured to run the instruction manager program and the first program such that the processors execute the plurality of instructions of the first program in an order in accordance with the second group identifier associated with the memory barrier instruction.

In accordance with systems consistent with the present invention, a data processing system is provided. The data processing system comprises a memory device and one or more processors. The memory device includes a first program having a plurality of memory instructions. The memory device further includes an instruction manager program that determines whether execution of a second of the memory instructions before a first of the plurality of memory instructions increases parallel performance of the program, when it is determined that execution of the second memory instruction before the first memory instruction increases parallel performance of the program, assigns one of a plurality of group identifiers to the second memory instruction that is not assigned to the first memory instruction, and provides a memory barrier instruction associated with the second memory instruction and having the one group identifier. The one or more processors are configured to run the instruction manager program and the first program such that the one or more processors are prompted to execute the second memory instruction before the first memory instruction in response to executing the memory barrier instruction.

In accordance with systems consistent with the present invention, a system is provided that includes means for assigning a first group identifier to one or more of a plurality of instructions appearing in a program after a first of the plurality of instructions; means for assigning a second group identifier to the first memory instruction, wherein the second group identifier is different than the first group identifier; and means for providing a memory barrier instruction associated with the first memory instruction and having the second one group identifier such that one or more processors with access to the program execute the plurality of instructions of the first program in an order in accordance with the different one group identifier associated with the memory barrier instruction.

In accordance with systems consistent with the present invention, a system is provided that includes means for determining whether execution of a second of a plurality of memory instructions in a program before a first of the plurality of memory instructions increases parallel performance of the program; means for, when it is determined that execution of the second memory instruction before the first memory instruction increases parallel performance of the program, assigning one of a plurality of group identifiers to the second memory instruction that is not assigned to the first memory instruction; and providing a memory barrier instruction associated with the second memory instruction and having the one group identifier such that one or more processors with access to the program are prompted to execute the second memory instruction before the first memory instruction.

In accordance with systems consistent with the present invention, a data processing system is provided. The data processing system comprises a memory and a processing unit. The memory includes a first program having a plurality of instructions, the plurality of instructions including a plurality of memory instructions and a memory barrier instruction, the memory barrier instruction and each of the plurality of memory instructions being associated with a respective one of a plurality of group numbers. The processing unit is configured to execute the plurality of instructions of the first program in an order in accordance with the respective one of the group numbers associated with the memory barrier instruction.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate one or more implementations of the invention and, together with the description, serve to explain the advantages and principles of the invention. In the drawings.

FIG. 5 depicts an example representation of the program of FIG. 4 in an assembly language targeted for processor 102 and 103;

FIG. 6 depicts an example representation of the program of FIG. 5 in an assembly language targeted for processor 102 and 103;

DETAILED DESCRIPTION

In accordance with methods, systems, and articles of manufacture consistent with the present invention, a memory instruction manager is provided to group and manage memory instructions associated with a program for execution by one or more processors.

Figure 1:
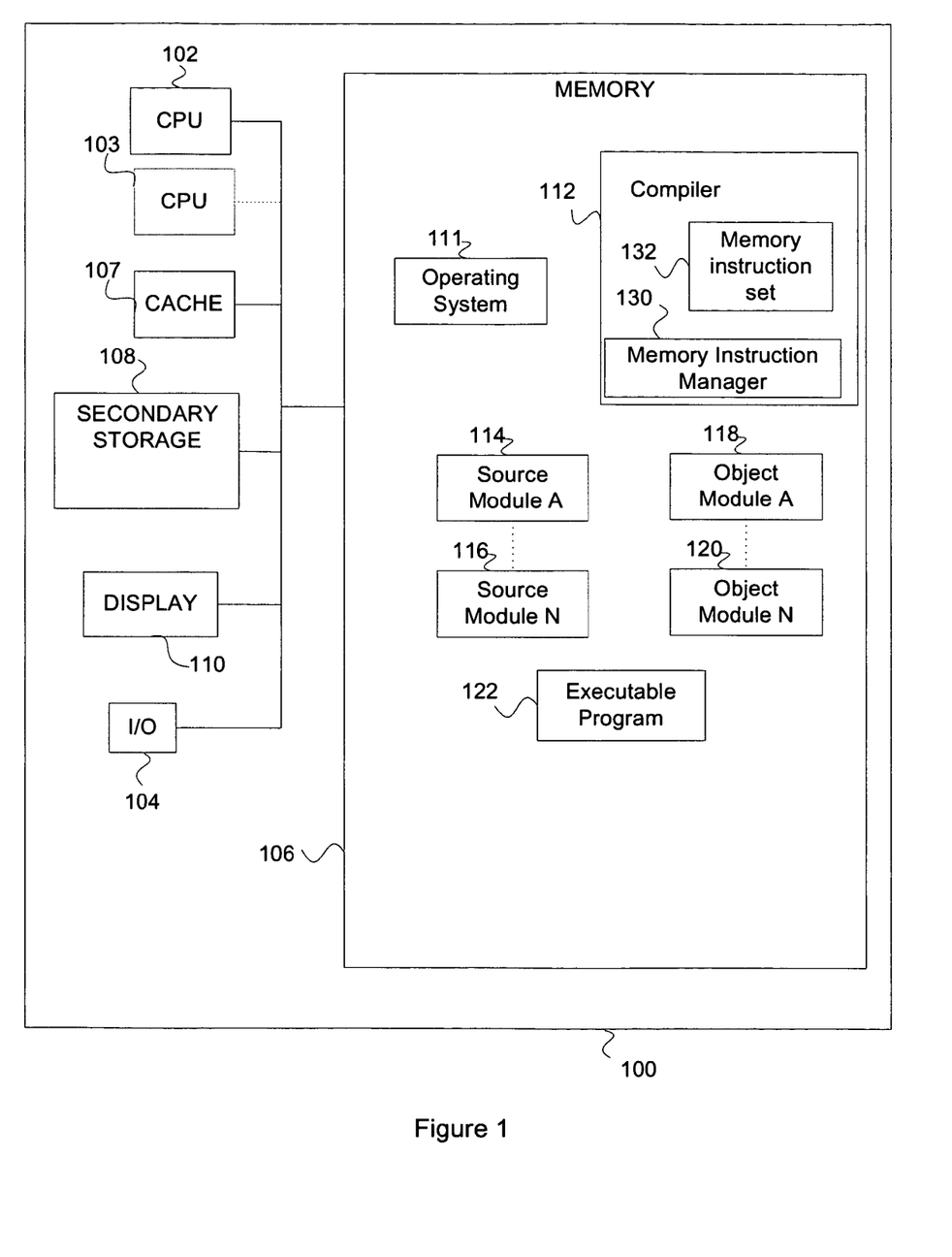
FIG. 1 depicts a block diagram of a data processing system suitable for use with methods and systems consistent with the present invention.

FIG. 1 depicts a block diagram of a data processing system 100 suitable for use with methods and systems consistent with the present invention. Data processing system 100 comprises a central processing unit (CPU) 102, an input output I/O unit 104, a memory 106, a cache 107, a secondary storage device 108, and a video display 110. Data processing system 100 may further comprise standard input devices such as a keyboard, a mouse or a speech processing means (each not illustrated). Data processing system 100 may also include a second CPU 103 for parallel processing instructions of a program contained in memory 106 or secondary storage 108. These various components of a data processing system may be physically located remotely from each other and connected via a network.

Memory 106 may contain an operating system 111 for managing the operation of applications or programs run using the processors 102 and 103. Memory 106 may also contain a compiler 112 and source code modules A-N (e.g., 114-116) translated by the compiler 112 to produce corresponding object code modules A-N (e.g., 118-120). The compiler 112 or a linker (not shown in figures) may link the object modules 118-120 to produce an application or executable program 122 to be run using one or more target processors, such as CPU 102 and 103. The executable program 122 has a plurality of instructions (not shown in FIG. 1) organized by the compiler in program order in accordance with source modules 114-116. CPUs 102 and 103 may perform the instructions in program 122 in an execution order, which may not correspond with the program order but is at least consistent with program order such that an unexpected result does not occur and processor self consistency is maintained as further explained below.

The compiler 112 may be a static compiler, a dynamic compiler (such as a Sun Virtual Machine™) that interprets source modules 114-116 at run-time for the target processor 102 or 103, or a combination of the two.

Compiler 112 may also include a memory instruction manager 130 and a set of memory instructions 132 that are recognized by the CPUs 102 and 103 in accordance with methods and systems consistent with the present invention. As discussed in further detail below, the memory instruction manager 130 is operably configured to identify memory instructions in the set 132 that correspond to compiled or object module 118-120 memory instructions contained in the program 122, and to manage the order of execution of the memory instructions contained in the program 122 by the processors 102 and 103.

The memory instruction manager 130 may comprise or may be included in one or more code sections containing instructions for performing respective operations. While the optimization tool 130 and other programs (e.g., compiler 112) are described as being implemented as software, the present implementation may be implemented as a combination of hardware and software or hardware alone. Also, one of skill in the art will appreciate that programs may comprise or may be included in a data processing device, which may be a server, communicating with data processing system 100.

In addition, although aspects of one implementation shown in FIG. 1 are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

A memory operation or instruction may be a read memory instruction, a write memory instruction, an atomic update instruction, a cache operation, or a control operation, each of which are included in instruction set 132. An atomic update instruction is recognized by the memory instruction manager 130 as an operation during which processor 102 or 103 simultaneously reads a memory location for a counter and increments the counter in the same bus operation if another processor 103 or 102 has not written to the memory location (preventing an erroneous update from occurring).

In one implementation, instruction set 132 includes two cache operations defined as a flush instruction and an invalidate instruction. A flush instruction with an associated group number causes the processor 102 or 103 to block fetching, loading, decoding, or execution of another memory instruction in the program 122 having the same group number, until the processor 102 or 103 completes all outstanding writes to update the cache line containing the memory address specified by the flush instruction and then writes dirty data to memory. The flush operation causes the processor 102 or 102 to write all dirty data in a cache line to memory so that a subsequent invalidate operation does not run the risk of losing valid data. In one implementation, the processor 102 and 103 are configured such that non-dirty data is not used to modify memory. This restriction inhibits the processor 102 and 103 from writing an entire cache line unless the entire line is dirty. The flush instruction is recognized by the processors 102 and 103 as a write operation when processing a control operation (such as a memory barrier instruction described below) in accordance with methods and systems consistent with the present invention.

An invalidate instruction causes the processor 102 or 103 to clear a valid bit (not shown in figures) on the cache line containing an address associated with the invalidate instruction. If it is necessary to preserve dirty data in the cache line then a programmer or compiler 112 may precede the invalidate instruction with a flush instruction. The invalidate instruction is recognized by the processors 102 and 103 as a write operation when processing a control operation (such as a memory barrier instruction described below) in accordance with methods and systems consistent with the present invention. Each invalidate operation has a group number to allow memory barrier instructions against the invalidate operation, but data in the line that is affected by the invalidate operation may come from a write memory instruction or other operation using any group number.

As described in detail below, the memory instruction manager 130 associates a group number with a control operation in the program to guide the processor 102 or 103 to complete operations or instructions in the program in an optimal order. Processors 102 and 103 handle a read memory instruction, a write memory instruction, and an atomic update instruction in accordance with known techniques except that the processors 102 and 103 recognize that each read memory, write memory, and atomic update instruction has an associated group number, which in conjunction with a control instruction having a matching group number controls when the respective instruction is executed.

In one implementation, the membar instruction as described below is a variation of the SPARC V9 membar memory instruction described in The SPARC Architecture Manual, Version 9 except that the membar instruction is assigned a group number by the memory instruction manager 130 in accordance with methods and systems consistent with the present invention to control the operation of groups of memory operations in the program 122.

The membar instruction may be used by the memory instruction manager 130 to perform one or more of the following three functions: to provide order constraints between memory operations in the program 122, to control when a memory operation in the program 122 is completed, and to inform the processor 102 or 103 as to which operations in the project are currently more important to execute.

In one implementation, the assembly language syntax used for the membar instruction is: "membar membar_mask [,group number]." In this implementation, the membar_mask is the bitwise OR of a mmask field (e.g., bits 0-3) and a cmask field (e.g., bits 4-6) in the membar instruction as described below. The group number (e.g., bits 7-12) of the membar instruction identifies the group of memory instructions (e.g., other pending read or write memory operations in the program 122) on which the processor 102 or 103 is to block processing. For example, if the group number assigned to the membar instruction is zero, the processor 102 or 103 applies the membar instruction to all outstanding or pending memory operations in the program 122.

As described in further detail below, the memory instruction manager 130 provides a membar instruction in a program 122 to introduce an order constraint between classes of memory operations appearing before the membar instruction and memory operations following the membar instruction in the program. The particular classes of memory operations are specified by the mmask field as shown in Table 1 below. Memory operation classes include a load (e.g., read from memory reference into processor 102 or 103) and a store (e.g., write to memory reference from processor 102 or 103). The membar instruction applies to all memory operations in all address spaces referenced by the issuing processor 102 or 103, but has no effect on memory references by other processors. The mmask field imposes an order constraint on memory references appearing before and after the membar instruction in the program 122. Any or all of the mmask bits described in Table 1 may be set by the memory instruction manager 130.

TABLE 1

| Mmask Bit | Description |
| --- | --- |
| #StoreStore | Store operations appearing in the program 122 prior to the membar instruction with a group number that matches the group number of the membar instruction are performed by the processor 102 or 103 handling the store operations before a store operation with a matching group number following the membar instruction is performed. |
| #LoadStore | Load operations appearing in the program 122 prior to the membar instruction with a group number that matches the group number of the membar instruction are performed before a store operation with a matching group number following the membar instruction is performed by processor 102 or 103. |
| #StoreLoad | Store operations appearing in the program 122 prior to the membar instruction with a group number that matches the group number of the membar instruction are performed by the respective processor 102 or 103 before a load operation with a matching group number following the membar instruction may be performed. |
| #LoadLoad | Load operations appearing in the program 122 prior to the membar instruction must have been performed by the respective processor 102 or 103 before a load operation with a matching group number following the membar instruction may be performed. |

Bits in the cmask field as described in Table 2 below specify additional constraints on the order of memory operations and the processing of instructions by processors 102 and 103. If no cmask bits are set in the membar_mask of a membar instruction, then the membar instruction causes the processor 102 or 103 to enforce the partial ordering specified by the mmask field. If cmask field is nonzero, then completion as well as partial order constraints are applied by the processors 102 and 103 based on the group number assigned to the membar instruction.

TABLE 2

| cmask Bit | Function | Description |
| --- | --- | --- |
| #Sync | Synchronization barrier | Nonmemory reference operations and memory reference operations having the same group number as the membar instruction and appearing prior to the membar instruction in the program 122 are performed by the processor 102 or 103 before an instruction after the membar instruction may be initiated by the respective processor 102 and 103. |
| #MemIssue | Memory issue barrier | Memory reference operations having the same group number as the membar instruction and appearing prior to the membar instruction in the program 122 are performed before any memory operations after the membar instruction may be initiated by the respective processor 102 and 103. |
| #Lookaside | Lookaside barrier | Store operations having the same group number as the membar instruction and appearing prior to the membar instruction in the program 122 are to be completed by the processor 102 or 103 before any load operation following the membar instruction that reference the same address may be initiated by the respective processor 102 and 103. |

By assigning a group number to memory operations subject to parallel processing that is different than a group number assigned to memory operations not-subject to parallel processing and then providing a membar instruction with the different group number as described below, the memory instruction manager 130 is able manage the execution of the memory instructions by the processors 102 and 103 by causing the processors to block access to the memory operations with the different group number in response to executing the membar instruction with the different group number. Thus, the memory instruction manager 130 is able to significantly improve, among other things, the run-time speed of the parallel processing of the program 122 by providing a membar instruction with an assigned group number.

For example, Table 3 below depicts a sequence or portion of instructions in the program 122 represented in psuedo code that the memory instruction manager 130 recognizes as being capable of parallel processing and provides a membar instruction (e.g., (b) "Set membar #StoreStore . . . ") having a group number that matches one or more preceding memory instructions (e.g., (a) "Write the words of a message . . . ") as described in further detail below. In accordance with systems and methods consistent with the present invention, processors 102 and 103 execute the sequence in Table 3 by writing a message to memory 106 or cache 107, writing a word to memory to indicate to a reader that the message is complete (e.g., (c)), and performing, in parallel with instructions (a), (b), and (c), a series of read and write memory instructions (e.g., (d) "Do loop computation . . . ") unrelated to the message without blocking the execution of the unrelated reads and writes to memory.

TABLE 3

(a) Write the words of a message with group number = 3
(b) Set membar #StoreStore with group number = 3
(c) Write a word with group number = 3 indicating to a reader that the message is available to be read
(d) Do loop computation unrelated to the message; use group number ≠ 3 for any memory operations In this example, the membar instruction (b) is assigned a group number of 3 by the memory instruction manager 130, which causes the processor 102 and 103 to block the write memory instruction (c) having the same group number of 3 until all write memory instructions (a) are complete. However, since the memory instruction manager 130 assigns a different group number not equal to 3 to the read and write memory instructions in (d), the memory instruction manager 130 is able to cause processors 102 and 103 to perform in parallel (rather than block initiating) the read and write instructions in (d) as well as any subsequent memory and non-memory operation (not shown in Table 3) in program 122.

Figure 2A:
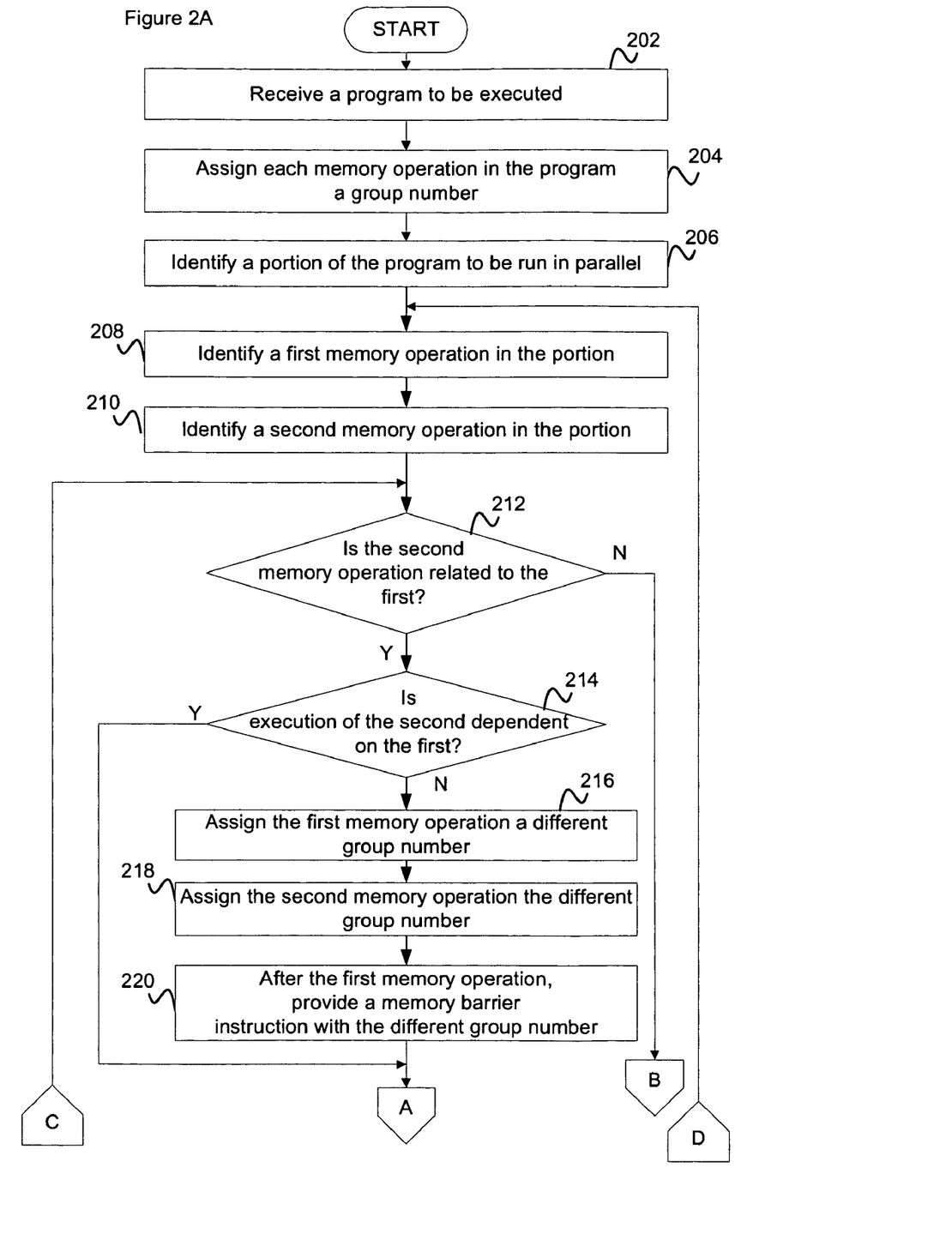
FIGS. 2A-2B depict a flow chart illustrating an exemplary process performed by a memory instruction manager grouping and managing instructions in a program consistent with the present invention.
Figure 2B:
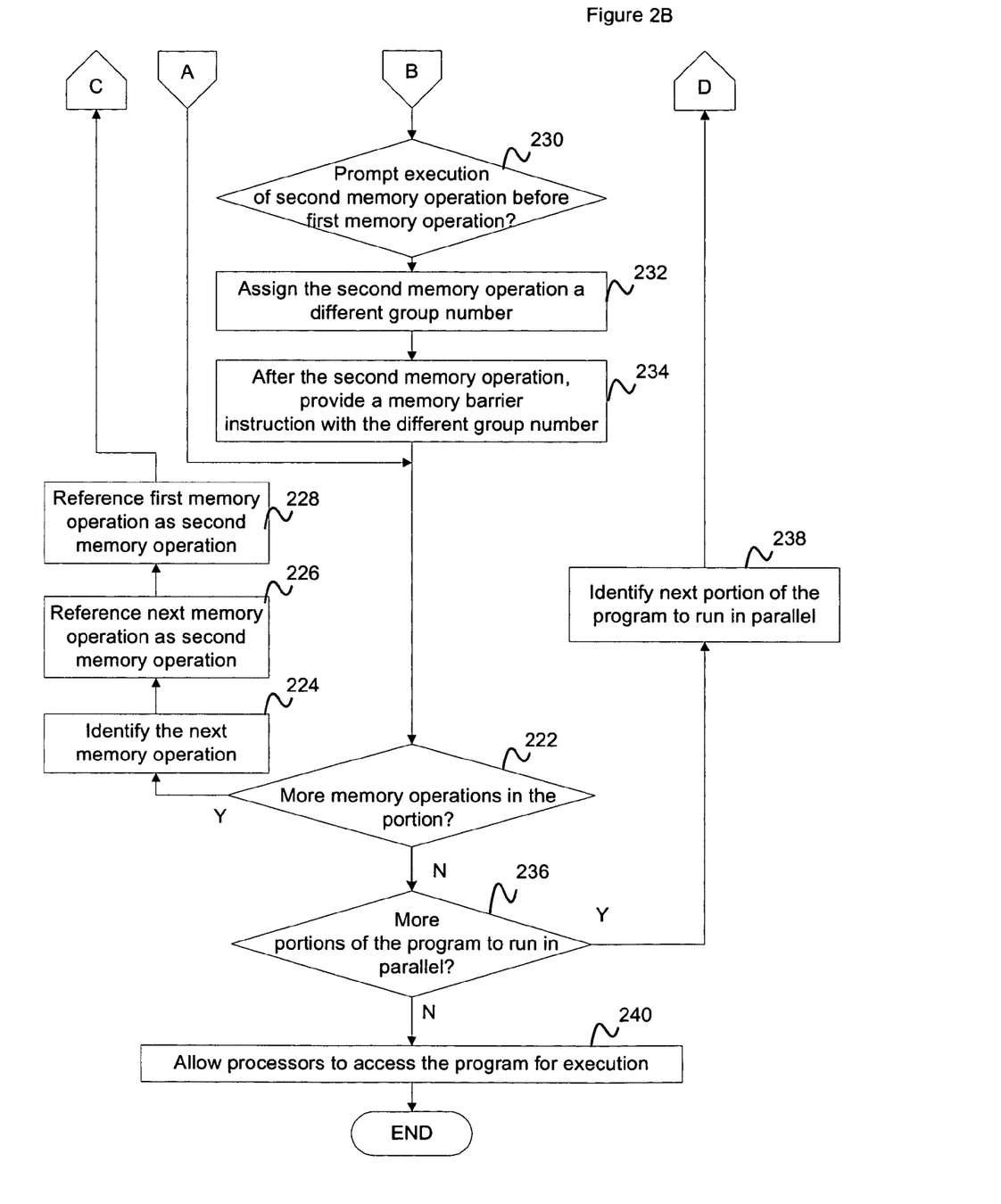

FIGS. 2A-2B depict a flow diagram illustrating an exemplary process 200 performed by the memory instruction manager 130 for grouping and managing for execution instructions in a program in accordance with methods, systems, and articles of manufacture consistent with the present invention. The memory instruction manager 130 improves the performance of the program by inhibiting important operations or instructions from being stalled behind operations of lower importance during parallel execution of the program. Systems and methods consistent with the present invention classify memory operations of a program into groups and then associate a memory control operation with one of the groups to cause a processor to expedite processing of the memory control operations not assigned to the one group.

Initially, the memory instruction manager 130 receives a program to be executed (step 202). The memory instruction manager 130 may receive a program 122 via the compiler 122 during compilation of the program 122. In another implementation, a programmer or user may identify the program 122 to the memory instruction manager 130 using a known data input technique, such as keyboard entry or a mouse click on a user interface (not shown in figures).

The memory instruction manager 130 then assigns every memory operation in the program a group number (step 204). In one implementation, the memory instruction manager 130 may identify each memory instruction in the program 122 and assign each a default group number, such as zero. The memory instruction manager 130 may use the instruction set 132 to identify a memory operation or instruction in the program 122. In another alternative, memory instructions in instruction set 132 may be pre-assigned a respective group number. In this implementation, when the program 122 is compiled, each memory operation in the program 122 is associated by the compiler 112 with the same group number as pre-assigned for the respective memory instruction in instruction set 132.

Figure 3:
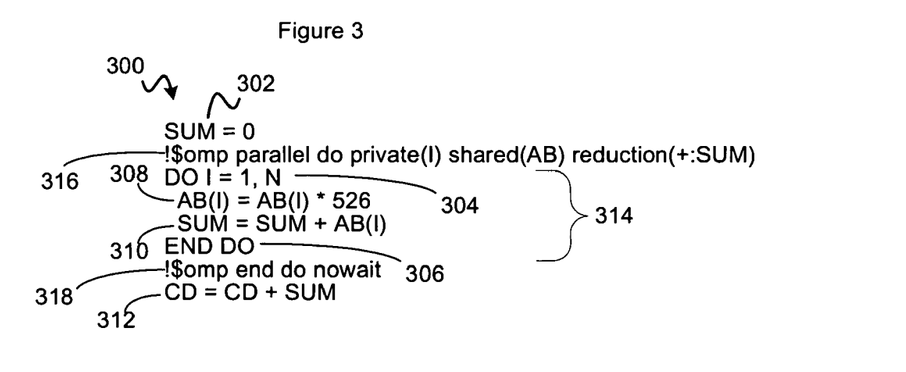
FIG. 3 depicts an example of a program having memory instructions identified by the memory instruction manager.

FIG. 3 depicts an example portion 300 of program 122 having non-memory instructions 302, 304, 306 and memory instructions 308, 310, and 312 identified by memory instruction manager 130 before the memory instruction manager 130 assigns a group number to an instruction 302, 304, 306, 308, 310, or 312.

Figure 4:
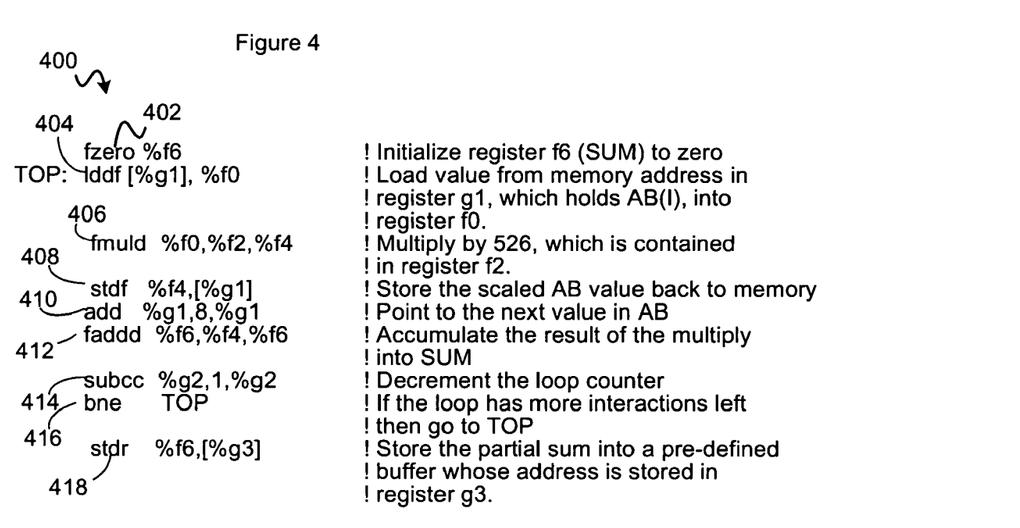
FIG. 4 depicts an example representation of the program of FIG. 3 in an assembly language targeted for processor 102 and 103.

FIG. 4 depicts an example representation 400 of the portion 300 of program 122 in an assembly language targeted for processor 102 and 103, in which assembly memory instructions 404, 408, 418 and non-memory instructions 402, 406, 410, 412, 414, 416 correspond to "SUM=0" instruction 302 and a "do loop" portion 314 of the program 122. Non-memory instructions 402, 406, 410, and 412 each access contents of one or more processor registers rather than a memory location to complete the respective operation. However, one skilled in the art will appreciate that non-memory instructions 402, 406, 410, and 412 may be coded similar to instructions 404, 408, and 418, such that a register of processor 102 or 103 holds a memory location to access in order to complete the respective memory operation 306, or 308 of the "do loop" portion 314.

FIG. 5 depicts an example representation 500 of the portion 300 of program 122 shown in FIG. 4 after the memory instruction manager 130 assigns a group number 504, 508, 518 to each memory instruction 404, 408, and 418. The memory instruction manager 130 may also assign a group number 502, 506, 510, 512, 514, and 516 to non-memory operations 402, 406, 410, 412, 414, and 416. In one implementation, the group number 504, 508, or 518 may be assigned based upon the type of memory operation, such as load (or read) memory operations being assigned to group 1 and store (or write) memory operations being assigned to group 2. In an alternative embodiment, the memory instruction manager may assign each memory operation 404, 408, and 418 the same initial group number, such as the group number 0.

Returning to FIG. 2A, the memory instruction manager 130 identifies a portion of the program 122 that is to be run in parallel (step 206). A programmer or the compiler 112 may indicate to the memory instruction manager 130 a portion of the program 122 to be run in parallel by demarcating the portion using delimiters. In the example shown in FIG. 3, a beginning delimiter 316 (e.g., "!$omp parallel") and an end delimiter 318 (e.g., "!$omp end") may be used by compiler 112 to identify the portion 314 of the program 122 between the two delimiters 316 and 318 for parallel processing.

Next, the memory instruction manager 130 identifies a first memory operation (step 208) and a second memory operation in the portion of the program 122 (step 210). As described above, the memory instruction manager 130 is able to recognize instructions 404, 408, and 418 as memory instructions and that these memory instructions 402, 408, and 418 correspond to the "do loop" portion 314 of the program 122 to be run in parallel. In the example shown in FIGS. 3 through 5, the memory instruction manager 130 initially identifies memory instruction 404 as the first memory operation and memory instruction 408 as the second memory instruction. As discussed below, the memory instruction manager 130 may subsequently identify memory instruction 408 as the first memory operation and memory instruction 418 as the second memory operation in accordance with the present invention. The memory instruction manager 130 may alternatively identify first and second memory operations out of program order.

The memory instruction manager 130 then determines whether the second memory operation is related to the first memory operation (step 212). The memory instruction manager 130 may determine that the second memory operation is related to the first memory operation when both memory operations reference the same memory location, address or bank of addresses. In the example set forth in Table 3 above, the memory instruction manager is thus able to determine that memory instruction (c) references the same address or bank of addresses (e.g., refers to the same message) as memory instruction (a). In the example shown in FIGS. 4 and 5, the memory instruction manager 130 is able to determine that memory instruction 404 is related to memory instruction 408 because both of these instructions reference the same memory address stored in register "% g1." The memory instruction manager 130 is also able to recognize that memory instruction 418 is not related to memory instruction 404 or 408 because memory instruction 418 references another memory address stored in register "% g3."

If the second memory operation is related to the first memory operation, the memory instruction manager 130 determines whether execution of the second memory instruction is dependent on the first memory instruction (step 214). The second memory instruction is dependent on the first memory instruction when, for example, the first memory instruction causes the processor 102 or 103 to store a value to a memory address and the second memory instruction requires the processor 102 or 103 to access the stored value from the memory address. Thus, memory instruction manager 130 is able to recognize when one memory instruction is dependent on another where the processor 102 or 103 is required to adhere to processor self-consistency rules and avoid obtaining a result that violates the order of the program 122. For example, memory instruction manager 130 is able to recognize that memory instruction 308 in FIG. 3 requires that processor 102 or 103 scale "AB(I)" by 526 (e.g., perform instructions 404 and 406) before the scaled AB(I) value is written back to the same memory location (e.g., before performing memory instruction 408). Thus, the memory instruction manager 130 is able to recognize that memory instruction 408 is dependent on memory instruction 404 as executing memory instructions 404 and 408 out of program order would generate a result that is not consistent with program order execution and likely to cause a run-time error. In the example described in reference to Table 3, the memory instruction manager 130 is able to recognize that the second memory instruction (c) is related but not dependent on the first memory instruction (a) because the second memory instruction (c) does not necessarily use a value from the same memory location as referenced by the first memory instruction (a) in order to complete the execution of the second memory instruction (c) (e.g., waiting for the instruction (a) to be completed before signaling the reader by completing instruction (c)).

If the second memory operation is related but not dependent on the first memory operation, the memory instruction manager 130 assigns the first memory instruction a different group number (step 216) and assigns the second memory instruction the different group number (step 218). In the example shown in FIG. 3, the memory instruction manager 130 assigns memory instruction (a) and memory instruction (c) a group number of "3," which the memory instruction manager 130 recognizes as being an unused group number as described in further detail below.

Next, the instruction manager 130 provides a memory barrier instruction with the different group number after or in association with the first memory operation (step 218). In the embodiment discussed in reference to Table 3, the instruction manager 130 provides the membar instruction (b) with the same group number "3" as the memory instruction (a). In addition, the instruction manager 130 may also set the mmask or cmask bits to correspond with the order or completion constraint (e.g., "StoreStore") required to inhibit processor 102 or 103 from completing the second memory instruction (e.g., instruction (c) in Table 3) before the first memory instruction (e.g., instruction (a)) but allowing a third or other unrelated instruction to be performed out of program order (e.g., instruction (c) in Table 3).

If the second memory operation is related and dependent on the first memory operation, the memory instruction manager 130 continues processing at step 222 described below. In the example shown in FIGS. 4-5, the memory instruction manager 130 is able to determine that memory instruction 408 depends on memory instruction 404 such that the processor 102 or 103 will not likely not violate self-consistency rules to perform memory instruction 408 before memory instruction 404. Thus, memory instruction manager 130 recognizes that in this instance a membar instruction is not required to impose an order constraint between related and dependent memory instructions.

Next, the memory instruction manager 130 determines whether there are more memory operations in the portion of the program 122 to be run in parallel (step 222). If there are more memory operations, the memory instruction manager 130 references the second memory operation as the first memory operation (step 224), identifies the next memory operation in the portion of the program 122 to be run in parallel (step 226), and references the next memory operation as the second memory operation (step 228) before continuing processing at step 212. Thus, in the example shown in FIG. 5, the memory operation manager 130 now identifies memory instruction 408 as the first memory instruction, identifies the next memory instruction 418 as the second memory instruction, and continues processing at step 212.

If the second memory operation is not related to the first memory operation, the memory instruction manager 130 determines whether to prompt execution of the second memory operation before the first memory operation (step 230). In one implementation, the memory instruction manager prompts execution of the second memory operation before the first memory operation when parallel performance by one processor (e.g., processor 102) is stalled awaiting the execution of the second memory operation by another processor (e.g., processor 103).

In example shown in FIG. 5, the memory instruction manager 130 is also able to recognize that the "do loop" in the portion 314 of the program 122 of FIG. 3 scales the first N elements of "AB" by 526 and sums them into "SUM." To accommodate parallel processing of the portion 314, the memory instruction manager 130 divides the loop iterations over the available processors 102 and 103 so that each processor 102 and 103 performs instructions 404, 406, 408, 410, 412, and 416 for part of the "do loop" (e.g., portion 314 of the program 122) in parallel with the other processors. At the end of the loop, each processor 102 and 103 has a partial sum (e.g., store in processor register "% f6" in FIGS. 4 and 5) corresponding to the sum of the elements in its part of AB. To complete the "do loop" portion 314 in the examples shown in FIGS. 4 & 5, the compiler 112 or memory instruction manager 130 requires that the processors 102 and 103 combine their partial sums into one final sum in accordance with memory instruction 310 by first storing their respective partial sum to memory via memory instruction 418. Once each of the processors 102 and 103 have executed memory instruction 418 to store its respective partial sum, the processor 102 and 103 may proceed to another instruction (e.g., 312 of FIG. 3).

However, when the portion 300, 400, or 500 of program 122 is executed in program order by processors 102 and 103, memory instruction 308 requires that AB be scaled by 526 and then written back to memory before the partial sum memory instruction 418. As shown in FIGS. 4 and 5, memory instruction 310 corresponds to assembly memory instruction 404 (for retrieving the current AB value), non-memory instruction 406 (for scaling the current AB value by 256), and memory instruction 408 (for storing the respective scaled AB value back to memory). Therefore, without the present invention, the processors 102 and 103 must wait to execute memory instruction 418 to write the processor's respective partial sum to memory until the completion of all writes to memory of the scaled AB values (e.g., memory instruction 408) by each of the processors 102 and 103 processing the "do loop" portion 314, which may be quite a long time. Thus, one processor (e.g., 102) may be stalled waiting for the other processor (e.g., 103) to execute memory instruction 418 to write its respective partial sum to memory. In accordance with methods and systems consistent with the present invention, the memory instruction manager 130 improves parallel performance by prompting processors 102 and 103 to execute memory instructions out of program order when execution of a second memory instruction before a first memory instruction increases parallel performance without altering a program result. In the example shown in FIG. 5, the memory instruction manager 130 is able to recognize that causing processors 102 and 103 to perform memory instruction 418 before any pending memory instruction 408 will inhibit processor 102 or 103 from stalling and increase parallelism performance.

Returning to FIG. 2B, if the second memory operation should be executed before the first memory operation, the memory instruction manager 130 assigns the memory instruction in the portion to be run in parallel a different group number (step 232) and provides a memory barrier instruction with the different group number after or in association with the first memory operation (step 234). Continuing with the example shown in FIG. 5, the memory instruction manager 130 assigns the group number "3" (which is different from the group number "0" initially assigned to instructions in program 122) to the second memory instruction 418 and provides the membar instruction 602 with the different group number 604 as depicted in FIG. 6. To further prompt the processor 102 and 103 to execute the second memory instruction 418 before the first memory instruction 408, the memory instruction manager 130 sets one or more of the cmask bits identified in Table 2 in accordance with the first and second memory instructions. For example, the cmask bit for "Sync" is set in membar instruction 602 to prompt the processor 102 or 103 to stall future memory and non-memory operations until all pending memory operations having the group number "3" are completed. Assuming processors 102 and 103 have delayed completion of one or more iterations of memory instruction 408 in order to continue processing the "do loop" portion 600, in response to executing membar instruction 602, processors 102 and 103 will likely continue to wait to execute the delayed or pending memory instructions 408 until memory instruction 418 is completed.

The memory instruction manager 130 then continues processing at step 222 to determine whether there are more memory operations in the portion of the program 122 to run in parallel. If there are no more memory operations in the portion of the program 122 to run in parallel, the memory operation manager 130 then determines whether there are more portions of the program 122 to run in parallel (step 236). If there are more portions to run in parallel, the memory instruction manager 130 identifies the next portion of the program to run in parallel (step 238) and continues processing at step 208. If there are no more portions of the program to run in parallel, the memory instruction manager 130 allows processors 102 and 103 to access the program for execution 122 (step 240) and then ends processing.

Figure 7:
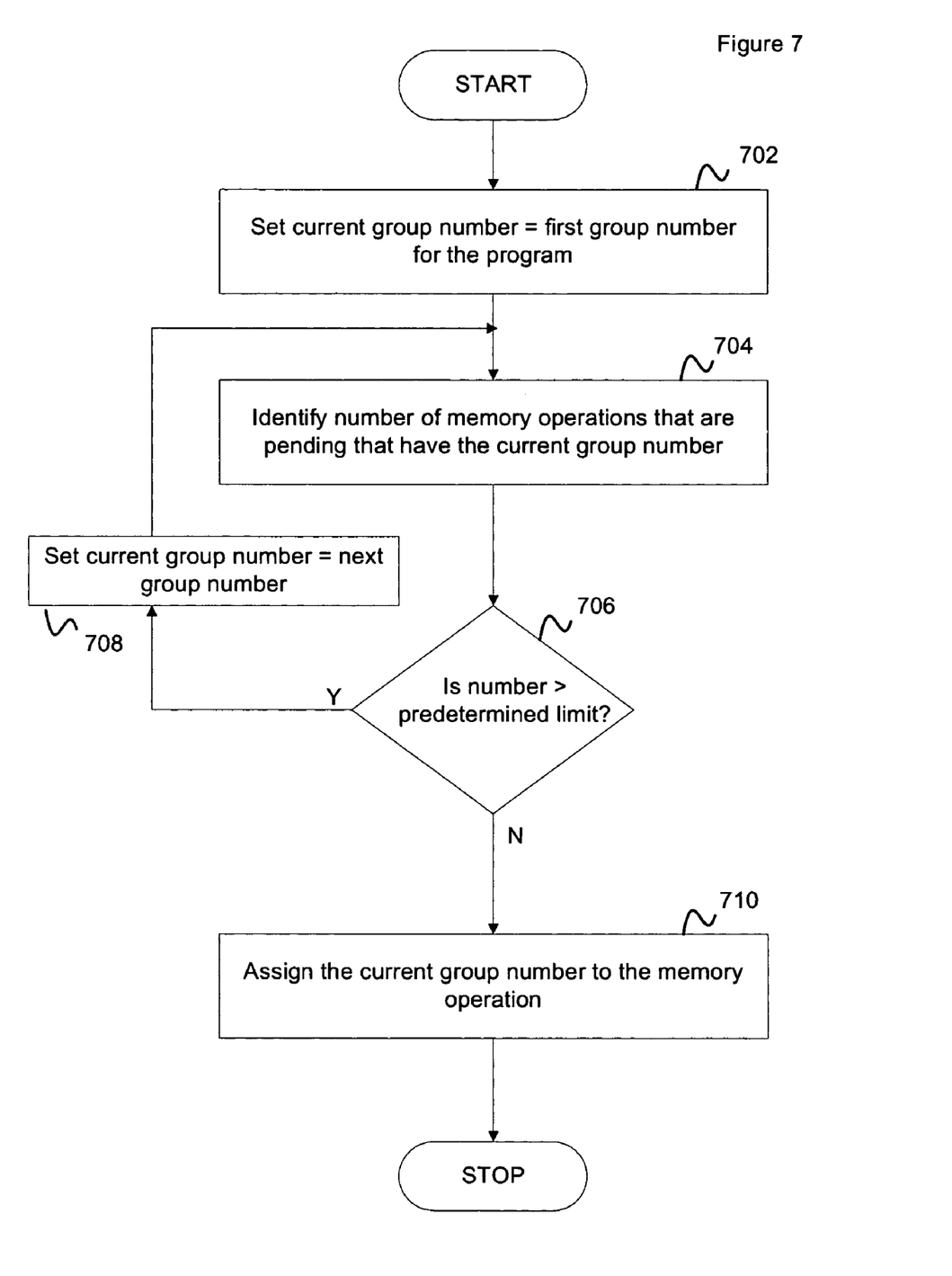
FIG. 7 depicts a flow chart illustrating an exemplary process performed by the memory instruction manager to identify and assign a group number to a memory instruction in the program.

FIG. 7 depicts a flow chart illustrating an exemplary process 700 performed by the memory instruction manager 130 to identify and assign a group number to a memory instruction in the program. In one implementation, the memory instruction manager 130 identifies a group number that is unused or not currently assigned to a pending instruction in the program 122 so that parallel performance is increased in accordance with methods and systems consistent with the present invention.

Figure 8:
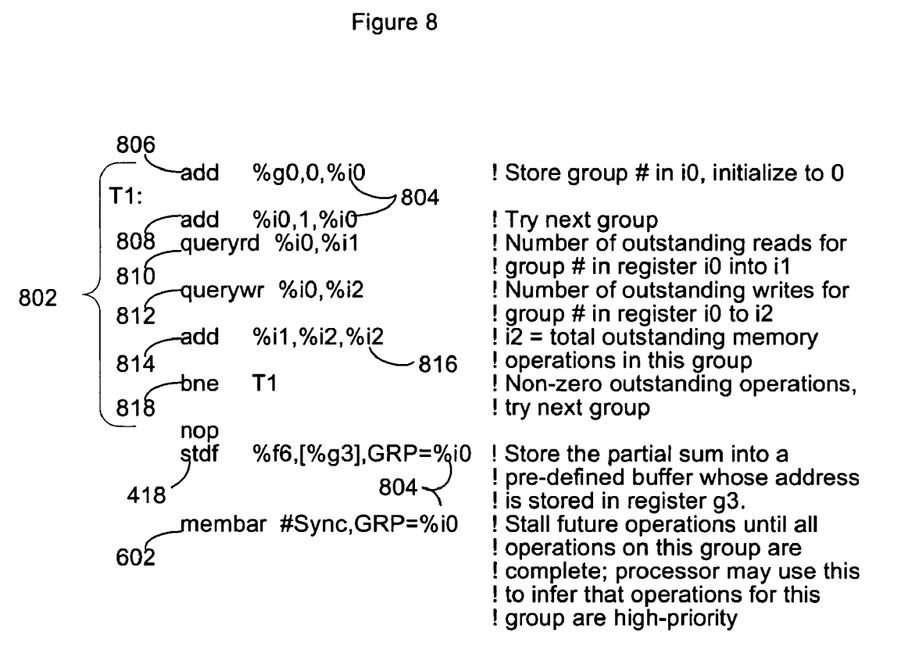
FIG. 8 depicts exemplary code that may be inserted by the memory instruction manager into the program to implement the process in FIG. 7.

FIG. 8 depicts exemplary code 802 that may be generated by the memory instruction manager 130 to implement the process 700. As shown in FIG. 8, the code 802 may be inserted by the memory instruction manager 130 into the program 122 to allow the respective processor 102 or 103 to identify an unused group number for use with a subsequent memory instruction (e.g., 418 in FIG. 8) and an associated memory barrier instruction (e.g., 602 in FIG. 8).

Initially, the memory instruction manager 130 sets a current group number to the first of a plurality of group numbers that may be assigned to the memory operation in the program 122 (step 702). In the implementation shown in FIG. 8, the memory instruction manager 130 causes processor 102 and 103 to set current group number 804 to "1" (e.g., instructions 806 and 808 cause processors 102 and 103 to set value stored in register "% i0" initially to "0" and then increment the value to "1").

The memory instruction manager 130 then identifies the number of memory instructions in the program 122 that have the current group number (step 704). In one implementation, the memory instruction manager 130 may review each memory instruction in the program 122 preceding the memory instruction (e.g., memory instruction 418) to be assigned the current group number 804 to determine the number of instructions in the program 122 using the current group number 804. In another implementation, memory instruction set 132 may include one or more query instructions 810 and 812 that the memory instruction manager 130 may insert in the program 122 as part of the code 802 to cause the processor 102 or 103 at run-time to identify the number of instructions in the program 122 having the current group number 804. For example, the memory instruction set 132 may include a query-read instruction 810 that causes the processor 102 or 103 to identify whether there are any read or load operations outstanding with a group number that matches the current group number 804 specified in the query read instruction 810. The memory instruction set 132 may also include a query-write instruction 812 that causes the processor 102 or 103 to identify whether there are any write or store operations outstanding with a group number that matches the current group number 804 specified in the query-write instruction 812. When two or more query instructions 810 and 812 are provided in the code 802, the memory instruction manager 130 may also provide another instruction 814 to cause the processor to calculate the number 816 of memory instructions having the current group number 804.

Next, the memory instruction manager 130 determines whether the number of memory instructions in the program 122 that have the current group number exceeds a predetermined limit (step 706). In the implementation shown in FIG. 8, the memory instruction manager causes the processor 102 or 103 to execute instruction 818 to determine at run-time whether the number 816 of outstanding memory instructions having the group number 804 exceeds the predetermined limit of zero. In an alternative implementation, memory instruction manager 130 may identify a non-zero predetermined limit to the processor 102 or 103.

If the number exceeds the predetermined limit, the memory instruction manager 130 sets the current group number to the next of the plurality of group numbers that may be assigned to an instruction in the program 122 (step 708). In the example implementation shown in FIG. 8, if the number exceeds the predetermined limit, the memory instruction manager causes the processor 102 or 103 to increment the current group number 804 (e.g., repeat instruction 808).

If the number does not exceed the predetermined limit, the memory instruction manager 130 assigns the current group number to the memory operation in the program 122 (step 708) and then ends processing. As shown in FIG. 8, the memory instruction manager 130 may cause the processor to assign the current group number 804 to the subsequent memory instruction 418 and memory barrier instruction 602 at run-time.

The foregoing description of exemplary implementations of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system for managing the execution of a plurality of instructions associated with a program, the method comprising the steps of:
   assigning a first group identifier to a second instruction of the plurality of instructions appearing in the program after a first instruction of the plurality of instructions;
   assigning a second group identifier to the first instruction; wherein the second group identifier is different than the first group identifier; and
   providing a memory barrier instruction associated with the first instruction and having the second group identifier such that one or more processors with access to the program executes the plurality of instructions of the program in an order in accordance with the second group identifier associated with the memory barrier instruction.

2. The method of claim 1, wherein the one or more processors are inhibited from executing the second instruction before the first instruction while being allowed to execute the one or more instructions assigned the first group identifier before the first instruction.

3. The method of claim 1, further comprising assigning a third group identifier to a third instruction of the plurality of instructions appearing in the program before the first instruction, wherein the memory barrier instruction having the second group identifier prompts the one or more processors to execute the first instruction before the third instruction.

4. The method of claim 1, wherein the plurality of instructions includes at least two classes, the first and second instructions and the memory barrier instructions reflect an order constraint between the at least two classes in accordance with the second group identifier.

5. The method of claim 1, wherein the plurality of instructions includes at least two classes, the first and second instructions and the memory barrier instruction reflect an order constraint among one of the at least two classes in accordance with the second group identifier.

6. The method of claim 1, wherein the memory barrier instruction reflects a completion constraint that causes the one or more processors to perform each of the plurality of instructions appearing in the program before the memory barrier instruction and having the second group identifier before one of the plurality of instructions appearing in the program after the memory barrier instruction.

7. The method of claim 1, the step of assigning a second group identifier further comprises:
   determining a number of the plurality of instructions that have the second group identifier;
   determining whether the number exceeds a predetermined value; and
   assigning the second group identifier to the first instruction in response to determining that the number does not exceed the predetermined value.

8. A method in a data processing system for managing the execution of a plurality of memory instructions associated with a program, comprising the steps of:
   determining whether execution of a second memory instruction of the plurality of memory instructions before a first memory instruction of the plurality of memory instructions increases parallel performance of the program;
   when it is determined that execution of the second memory instruction before the first memory instruction increases parallel performance of the program,
      assigning one of a plurality of group identifiers to the second memory instruction that is not assigned to the first memory instruction; and
      providing a memory barrier instruction associated with the second memory instruction and having the one of the plurality of group identifiers such that one or more processors with access to the program are prompted to execute the second memory instruction before the first memory instruction.

9. The method of claim 8, the step of assigning one of a plurality of group identifiers further comprises:
   determining a number of the plurality of memory instructions that have the one of the plurality of group identifiers;
   determining whether the number exceeds a predetermined value; and
   assigning the one of the plurality of group identifiers to the second memory instruction in response to determining that the number does not exceed the predetermined value.

10. A computer-readable storage medium containing instructions for controlling a data processing system to perform a method for managing the execution of a plurality of instructions associated with a program, the method comprising the steps of:
   assigning a first group identifier to a second instruction of the plurality of instructions appearing in the program after a first instruction of the plurality of instructions;
   assigning a second group identifier to the first instruction, wherein the second group identifier is different than the first group identifier; and
   providing a memory barrier instruction associated with the first instruction and having the second group identifier such that one or more processors with access to the program execute the plurality of instructions of the program in an order in accordance with the second group identifier associated with the memory barrier instruction.

11. The computer-readable storage medium of claim 10, wherein the one or more processors are inhibited from executing the second instruction before the first instruction while being allowed to execute the one or more instructions assigned to the first group identifier before the first instruction.

12. The computer-readable storage medium of claim 10, further comprising assigning a third group identifier to a third instruction of the plurality of instructions appearing in the program before the first instruction, wherein the memory barrier instruction having the second group identifier prompts the one or more processors to execute the first instruction before the third instruction.

13. The computer-readable storage medium of claim 10, wherein the plurality of instructions includes at least two classes, the first and second instructions and the memory barrier instruction reflect an order constraint between the at least two classes in accordance with the second group identifier.

14. The computer-readable storage medium of claim 10, wherein the plurality of instructions includes at least two classes, the first and second instructions and the memory barrier instruction reflect an order constraint among one of the at least two classes in accordance with the second group identifier.

15. The computer-readable storage medium of claim 10, wherein the memory barrier instruction reflects a completion constraint that causes the one or more processors to perform each of the plurality of instructions appearing in the program before the memory barrier instruction and having the second group identifier before one of the plurality of instructions appearing in the program after the memory barrier instruction.

16. The computer-readable storage medium of claim 10, the step of assigning a second group identifier further comprises:
   determining a number of the plurality of instructions that have the second group identifier;
   determining whether the number exceeds a predetermined value; and
   assigning the second group identifier to the first instruction in response to determining that the number does not exceed the predetermined value.

17. A computer-readable storage medium containing instructions for controlling a data processing system to perform a method for managing the execution of a plurality of memory instructions associated with a program, the method comprising the steps of:
   determining whether execution of a second memory instruction of the plurality of memory instructions before a first memory instruction of the plurality of memory instructions increases parallel performance of the program;
   when it is determined that execution of the second memory instruction before the first memory instruction increases parallel performance of the program,
      assigning one of a plurality of group identifiers to the second memory instruction that is not assigned to the first memory instruction; and
      providing a memory barrier instruction associated with the second memory instruction and having the one of the plurality of group identifiers such that one or more processors with access to the program are prompted to execute the second memory instruction before the first memory instruction.

18. The computer-readable storage instruction of claim 17, the step of assigning one of a plurality of group identifiers further comprises:

determining a number of the plurality of memory instructions that have the one of the plurality of group identifiers;

determining whether the number exceeds a predetermined value; and assigning the one group identifier to the second memory instruction in response to determining that the number does not exceed the predetermined value.

19. A data processing system, comprising:
a memory device further comprising:
a first program having a plurality of instructions; and
an instruction manager program that assigns a first group identifier to a second instruction of the plurality of instructions appearing in the first program after a first instruction of the plurality of instructions, assigns a second group identifier to the first instruction and wherein the second group identifier is different than the first group identifier and provides a memory barrier instruction associated with the first instruction and having the second group identifier; and
one or more processors that run the instruction manager program and the first program such that the one or more processors execute the plurality of instructions of the first program in an order in accordance with the second one group identifier associated with the memory barrier instruction.

20. The data processing system of claim 19, wherein the one or more processors are inhibited from executing the second instruction before the first instruction while being allowed to execute the one or more instructions assigned the first identifier before the first memory instruction.

21. The data processing system of claim 19, the instruction manager program further comprises assigning a third group identifier to a third instruction of the plurality of instructions appearing in the program before the first instruction, wherein the memory barrier instruction having the second group identifier prompts the one or more processors to execute the first instruction before the third instruction.

22. The data processing system of claim 19, wherein the step of assigning a second group identifier further comprises:
determining a number of the plurality of instructions that have the second group identifier;
determining whether the number exceeds a predetermined value; and
assigning the second group identifier to the first instruction in response to determining that the number does not exceed the predetermined value.

23. A data processing system, comprising:
a memory device further comprising:
a first program having a plurality of memory instructions; and
an instruction manager program that determines whether execution of a second memory instruction of the plurality of memory instructions before a first memory instruction of the plurality of memory instructions increases parallel performance of the programs, when it is determined that execution of the second memory instruction before the first memory instruction increases parallel performance of the program, assigns one of a plurality of group identifiers to the second memory instruction that is not assigned to the first memory instruction, and provides a memory barrier instruction associated with the second memory instruction and having the one of the plurality of group identifiers; and
one or more processors that run the instruction manager program and the first program such that the one or more processors are prompted to execute the second memory instruction before the first memory instruction in response to executing the memory barrier instruction.

24. The data processing system of claim 23, wherein the step of assigning one of a plurality of group identifiers further comprises:
determining a number of the plurality of memory instructions that have the one of the plurality of group identifiers;
determining whether the number exceeds a predetermined value; and
assigning the one of the plurality of group identifiers to the second memory instruction in response to determining that the number does not exceed the predetermined value.

25. A computer-implemented system, comprising:
means for assigning a first group identifier to a second instruction of a plurality of instructions appearing in a program after a first instruction of the plurality of instructions;
means for assigning a second group identifier to the first instruction, wherein the second group identifier is different than the first group identifier; and
means for providing a memory barrier instruction associated with the first memory instruction and having the second group identifier such that one or more processors with access to the program executes the plurality of instructions of the program in an order in accordance with the second group identifier associated with the memory barrier instruction.

26. The computer-implemented system of claim 25, wherein the one or more processors are inhibited from executing the second instruction before the first instruction while being allowed to execute the one or more memory instructions assigned the first group identifier before the first instruction.

27. The computer-implemented system of claim 25, further comprising means for assigning a third group identifier to a third instruction of the plurality of instructions appearing in the program before the first instruction, wherein the memory barrier instruction having the second group identifier prompts the one or more processors to execute the first instruction before the third instruction.

28. The computer-implemented system of claim 25, wherein the means for assigning a second group identifier further comprises:
means for determining a number of the plurality of instructions that have the second group identifier;
means for determining whether the number exceeds a predetermined value; and
means for assigning the second group identifier to the first instruction in response to determining that the number does not exceed the predetermined value.

29. A computer-implemented system, comprising:
means for determining whether execution of a second memory instruction of a plurality of memory instructions in a program before a first memory instruction of the plurality of memory instructions increases parallel performance of the program;
means for, when it is determined that execution of the second memory instruction before the first memory instruction increases parallel performance of the program, assigning one of a plurality of group identifiers to the second memory instruction that is not assigned to the first memory instruction; and providing a memory barrier instruction associated with the second memory instruction and having the one of the plurality of group identifiers such that one or more processors with access to the program are prompted to execute the second memory instruction before the first memory instruction.

30. The computer-implemented system of claim 29, wherein means for assigning one of a plurality of group identifiers further comprises:
   means for determining a number of the plurality of memory locations that have the one of the plurality of group identifiers;
   means for determining whether the number exceeds a predetermined value; and
   means for assigning the one of the plurality of group identifiers to the second memory instruction in response to determining that the number does not exceed the predetermined value.

31. A data processing system comprising:
   a memory comprising a first program having a plurality of instructions, the plurality of memory instructions including a memory barrier instruction, the memory barrier instruction and each of the plurality of memory instructions being associated with a respective one of a plurality of group numbers; and
   a processing unit that is configured to execute the plurality of memory instructions of the first program in an order in accordance with the respective one of the plurality of group numbers associated with the memory barrier instruction.

32. The data processing system of claim 31, wherein in response to executing the memory barrier instruction, the processing unit executes a first memory instruction of the plurality of memory instructions associated with the same one of the plurality of group numbers as the memory barrier instruction and appearing before the memory barrier instruction in the program before executing a second memory instruction of the plurality of memory instructions having the same one of the plurality of group numbers and appearing after the memory barrier instruction in the program.

33. The data processing system of claim 32, wherein:
   a third memory instruction of the plurality of memory instructions is associated with a different one of the plurality of group numbers and appears after the memory barrier instruction in the program; and
   the processor is not inhibited from executing the third memory instruction before the first memory instruction in response to executing the memory barrier instruction.

34. The data processing system of claim 32, wherein:
   a fourth memory instruction of the plurality of memory instructions is associated with a different one of the plurality of group numbers and appears before the memory barrier instruction in the program; and
   the processor is prompted to execute the first memory instruction before the fourth memory instruction in response to executing the memory barrier instruction.

* * * * *